Nov. 24, 1964 M. CAMRAS 3,158,670

METHOD AND MEANS FOR PRODUCING MAGNETIC RECORD MEMBERS

Filed May 15, 1961

INVENTOR.
Marvin Camras
BY
Hill, Sherman, Meroni, Gross & Simpson
ATTORNEYS

United States Patent Office 3,158,670
Patented Nov. 24, 1964

3,158,670
METHOD AND MEANS FOR PRODUCING MAGNETIC RECORD MEMBERS

Marvin Camras, Glencoe, Ill., assignor to IIT Research Institute, a corporation of Illinois Filed May 15, 1961, Ser. No. 109,962
4 Claims. (Cl. 264—293)

This invention relates to a method and means for treating a magnetic record member and particularly to a method and means for smoothing the active surface thereof.

As the information density to be recorded on a magnetic record member is increased, a number of problems are encountered in present day magnetic recording. One of the most important is the maintaining of adequate contact between the record member active surface and the head. Another is the relatively high noise level that occurs at short wavelengths. Both problems are caused in great measure by lack of adequate stable coupling between the head and record member due to roughness of the record member active surface.

For recording in the megacycle range an increase in information density allows a reduction in the high record member speeds now required. At normal speeds and at extra low speeds an equivalent saving also takes place.

Accordingly, it is an important object of the present invention to provide a novel method and means for treating magnetic record members to greatly improve the response characteristics thereof at high speeds.

Another object of the invention is to provide a novel method and means for greatly increasing the smoothness of the operative surfaces of magnetic record media.

Still another object of the invention is to provide a method for smoothing the operative surfaces of magnetic record media which is especially suitable where the active surface is of thermoplastic material.

A further object of the invention is to provide a method of smoothing tape surfaces which may be applied during the process of forming the magnetizable coating on the tape.

An important feature of the present invention resides in the provision of a magnetic tape smoothing system in which the active surface of the tape is pressed against a polished surface of a drum and in which a plurality of stationary members having tape-engaging edges are arranged in arcuately spaced relation about the drum and press the tape against the drum to provide a series of smoothing actions as the drum is rotated.

Another important feature of the invention resides in the concept of maintaining the smoothing roll at a constant temperature and stripping the tape from the roll while the roll remains at the constant temperature. By this feature, the problem of attempting to heat and cool a massive roller at desirable high operating speeds is overcome.

Still another feature of the invention resides in the provision of multiple passages of the tape over different parts of the same smoothing roller. It is found that this will build up a smoother surface in the tape than a single pass.

A further feature of the invention resides in providing multiple ironing means for forcing entrapped air bubbles and the like out of the tape. Otherwise sealed air pockets between the tape and smoothing surface prevent a continuous defect-free surface from being formed on the tape.

Yet another and further important feature of the invention resides in the utilization of a temperature substantially above those suggested in the prior art, it having been found that superior smoothing action is obtained with the use of temperatures of about 250° F. measured at the external surface of the smoothing roller.

Other and further important objects, features and advantages of the present invention will be apparent from the following detailed description taken in connection with the accompanying drawings, in which.

As shown on the drawings.

Figures 1, 2:
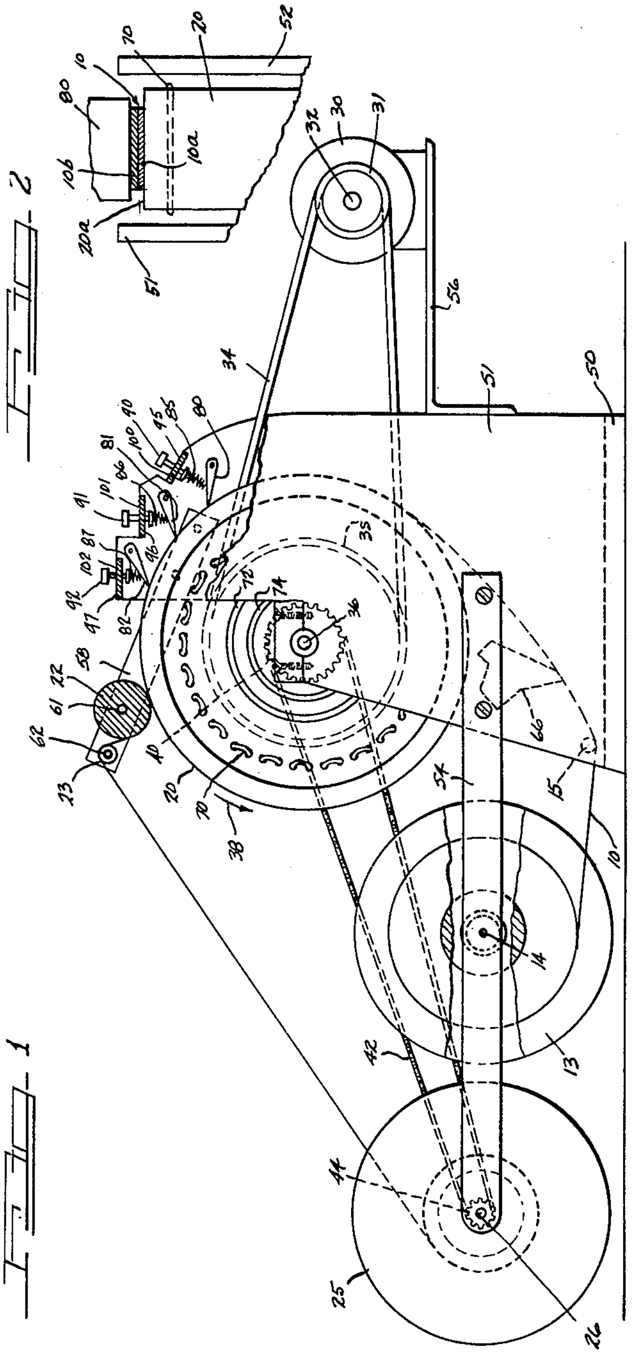
FIGURE 1 is a somewhat diagrammatic side elevational view of a preferred tape smoothing apparatus in accordance with the present invention, certain parts being broken away and shown in section for clarity of illustration.
FIGURE 2 is a fragmentary vertical sectional view illustrating the operation of the metal pressure edge type smoothing devices of the present invention.

FIGURES 1 and 2 illustrate a suitable mechanism for highly polishing the active surface of a tape record medium 10. For illustrative purposes, a roll of tape is illustrated as being carried by means of a supply reel 13 which is rotatably mounted by a shaft indicated at 14. The record medium is led under a suitable guide pin 15 and about a smoothing roller 20 having a highly polished substantially smooth cylindrical exterior surface. The tape is stripped from the surface of roller 20 by means of guide rolls 22 and 23 and is then delivered to a take-up reel 25 which is mounted on a rotatable shaft indicated at 26. It will be understood that the tape on reel 13 has its magnetizable active surface on the inner side thereof so as to be directly in contact with the polished surface of the drum 20. For diagrammatic purposes the record medium 10 has been indicated in FIGURE 2 as comprising a magnetizable active layer **10*a* and a non-magnetic base layer 10*b*. As seen in FIGURE 2, the active surface of the magnetizable layer 10*a* is in confronting pressure contact with the substantially optically smooth surface 20*a* of the drum 20** which is of cylindrical configuration.

The drum 20 is illustrated as being driven from a suitable electric motor 30 by means of a V-pulley 31 on the motor shaft 32, a V-belt 34 and a V-pulley 35 secured to the shaft 36 on which the smoothing drum 20 is mounted. The drum 20 is thus rotated in the direction of the arrow 38 to pull the record medium 10 from the reel 13 and deliver it to the take-up reel 25. Suitable means are provided for driving the take-up reel 25 at sufficient speed to always maintain a tension on the record medium between guide roll 23 and the reel 25. Such means have been indicated as comprising a sprocket wheel 40 secured to the drum shaft 36 and thus driven from the motor 30, a sprocket chain 42 and a sprocket wheel 44 on the shaft 26 which mounts the reel 25. Suitable clutch means are interposed between the drive sprocket 44 which is rotatable relative to the shaft 26 and the shaft so as to provide a friction type slipping drive for the reel 25.

In the illustrated embodiment, shaft 36 is journalled by means of a framework 50 having upstanding side members 51 and 52. A horizontal supporting piece 54 on one side of reels 13 and 25 and a corresponding horizontal supporting piece on the opposite side of the reels 13 and 25 mount the reel shafts 14 and 26. A rearwardly extending motor support bracket 56 carries motor 30. An upwardly and forwardly sloping frame piece 58 and a corresponding piece on the opposite side of rollers 22 and 23 provide bearings for shafts 61 and 62 thereof.

The reference numeral 66 indicates a suitable wick type applicator for moistening the tape active layer **10*a* and polishing roll 20** with naphtha or the equivalent. The tape is moistened to soften the coating and/or to enable it to separate from the smoothing roll more readily. The moistening agent is chosen such that it softens the active layer 10*a* but does not appreciably dissolve it. Naphtha has been found suitable for the coating on a typical "Mylar" based tape. Other tapes may require stronger or weaker agents, as for example alcohols, chlorinated hydrocarbons, petroleum products, silicones, etc. These may be determined by experiment aided by a knowledge of the solubility of the binder used for a particular tape under consideration. The softened coating is more readily pressed into intimate contact with the smoothing surface of the roll 20. Heating also softens the coating.

The roller 20 is heated to a predetermined constant temperature by means of electric heating coil means indicated generally at 70. Electric current is supplied to the heating coil by means of a pair of slip rings 72 and 74 on the drum 20 and stationary brush means (not shown) on side member 51. Thus electric current is supplied to the heating coil means 70 by means of the brush means for heating the drum to a predetermined temperature.

For the typical "Mylar" based tape mentioned above, it has been found advantageous to maintain the surface of the roll 20 at a temperature of about 250° F. This can be measured by placing a thermocouple against the tape smoothing surface while the drum is stationary but at its operating temperature.

Further, it has been experimentally determined that optimum results are obtained by utilizing at least two and preferably at least three close fitted metal pressure edges such as indicated at 80, 81 and 82 which act on the tape in succession to press the tape into contact with the heated smooth surface 20*a*. As indicated in FIGURE 1, the pressure edges 80, 81 and 82 have respective adjustable compression spring means 85, 86 and 87 whose compression force is adjustable by respective screw thread adjustment means 90, 91 and 92 threadedly engaged in respective horizontal flange members 95, 96 and 97 and having suitable collar means such as indicated at 100, 101 and 102 secured to the screw thread means 90–92 and adjustable away from the flanges 95–97 to adjust the compressive force exerted by the compression springs 85–87.

It will be noted that in the illustrated embodiment, no attempt is made to cool the drum at the point where the tape is stripped therefrom, and it is found that this mode of operation results in a highly smooth substantially flat active surface on the treated tape. The use of pressure edges such as 80–82 successively acting on the tape produces an active tape surface which is substantially improved over the surfaces obtained by the methods and apparatus of my prior application Serial No. 723,451 filed March 24, 1958, now U.S. Patent No. 2,998,325 issued August 29, 1961.

By way of example, the roll 20 may be a smooth roll about 9 inches in diameter by 3 inches wide. The outer surface may be made of stainless steel. The surface is ground and polished to the best possible optically smooth finish.

The use of a stripping roll such as indicated at 22 in conjunction with the use of a smoothing roll maintained at a constant high temperature has also resulted in an improvement in the efficiency and effectiveness of the smoothing operation, particularly in combination with the wick type applicator as indicated at 66 for moistening the tape and polishing roll with naphtha or the like immediately prior to contact therebetween.

Figure 3:
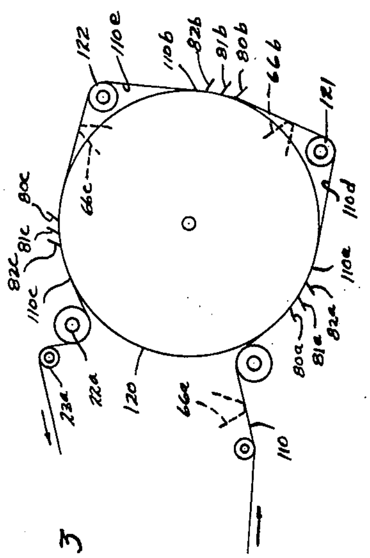
FIGURE 3 is a diagrammatic illustration of an apparatus similar to that shown in FIGURE 1 but wherein the tape makes multiple passages over different parts of the same smoothing drum.

FIGURE 3 illustrates an embodiment of the invention wherein the tape record medium 110 from a supply reel corresponding to reel 13 in FIGURE 1 is caused to pass about a cylindrical drum 120 with a number of passes such as indicated at 110*a*, 110*b* and 110*c*, the tape being guided over rolls 121 and 122 between sections 110*a* and 110*b* and between sections 110*b* and 110*c* thereof. A stripping roll 22*a* and guide roll 23*a* for the tape are indicated which may correspond identically to those of FIGURE 1. A take-up reel (not shown) may be mounted and driven as in the embodiment of FIGURE 1. Preferably a set of metal pressure edges such as indicated at 80*a*, 81*a* and 82*a* cooperate with the pass 110*a* of the tape in the same manner as indicated for pressure edges 80–82 in FIGURE 1. Similarly, second and third series preferably of at least three metal pressure edges 80*b*, 81*b* and 82*b* and 80*c*, 81*c* and 82*c* act on the second and third passes 110*b* and 110*c* of the tape, respectively, in the same manner as illustrated for the pressure edges 80–82 in FIGURE 1. Suitable wick-type applicator means is indicated at 66*a* for applying naphtha or the like to the active surface of the record medium 110 immediately prior to its first contact with the roll 120. Second and third wick type applicator means 66*b* and 66*c* may be applied to the runs of tape indicated at 110*d* and 110*e* prior to the second and third contacts of the tape with the drum 120. The drum is preferably heated to the same temperature as described in connection with FIGURE 1 and is stripped from the drum in each case while maintaining the drum at a constant high temperature within the aforementioned range. It is found that passing the tape over the same drum surface a number of times significantly improves the smoothness of the active surface of the tape.

It is believed that the metal pressure edges such as 80–82 serve to force entrapped air bubbles and the like out of the region of contact between the tape and the surface of the smoothing roll as well as pressing the active surface of the tape into conforming pressure contact with the smoothing surface of the roll 20 or 120. Without the pressure edges, sealed air pockets between the tape and smoothing surface prevent a continuous defect-free surface. Other effective ironing means such as revolving brushes as indicated at 50 and 51 in FIGURES 2*a* and 2*b* of my copending application Serial No. 723,451 together with a felt covered roll such as indicated at 53 in FIGURE 2*a* of said copending application provide a desirable multiple ironing action at successive points about the periphery of the smoothing drum to iron out most irregularities, air bubbles and the like, but the multiple metal pressure edges such as indicated at 80–82 are preferred since this configuration gives superior results.

Nevertheless, by way of illustration of the broad concept of multiple ironing actions, the disclosure of FIGURES 2, 2*a*, 2*b* and 4, of my copending application Serial No. 723,451 is specifically incorporated herein by reference. The successive brushes (50 and 51) and felt covered roll (53) contacting the back of inactive surface of the record medium as it travels about the drum of my copending application may rotate opposite to the direction of tape movement about the drum; that is, if the drum rotates in a counterclockwise direction, the brushes (50 and 51) and roll (53) will be driven positively in a counterclockwise direction so as to provide a surface velocity of the brushes which is opposite in direction to the surface velocity of the drum at their region of mutual contact with the tape. The rollers may be driven at a higher speed than the surface speed of the tape and smoothing roller so as to further enhance the ironing action thereof.

The present application is a continuation in part of my copending application Serial No. 723,451 filed March 24, 1958.

The pressure edges of the present invention preferably contact only a limited longitudinal increment of the tape which increment is substantially less than the width dimension of the tape, and preferably is not more than about ¼ inch in length regardless of the width of the tape.

It will be apparent that many modifications and variations may be effected without departing from the scope of the novel concepts of the present invention.

I claim as my invention:

1. The method of treating a magnetic record medium having a layer containing magnetizable material and providing an active external surface of the magnetic record medium which comprises guiding the magnetic record medium about a cylindrical smoothing surface polished to substantially optical precision and rotatable about its central axis, engaging the active surface of the magnetic record medium with a portion of said polished cylindrical smoothing surface of substantial arcuate length, applying heat to said magnetic record medium while engaged with said portion of said polished cylindrical surface for softening the layer of the record medium containing said magnetizable material to place said active surface in a flowable condition, pressing longitudinally spaced portions of said active surface of said magnetic record medium into pressure engagement with said polished cylindrical smoothing surface by means of a plurality of metal pressure edges arranged in arcuately spaced relation about the axis of rotation of said polished cylindrical smoothing surface and pressed against the surface of said magnetic record medium opposite said active surface.

2. Apparatus for treating a magnetic record medium having a layer containing magnetizable material and providing an active external surface of the record medium comprising means defining respective smoothing surface portions of substantially greater smoothness than the active surface for engaging respective portions of the active surface of the record medium, means for moving the active surface of the magnetic record medium and the smoothing surface portions at substantially the same speed, means for placing the active surface of the magnetic record medium in a softened flowable condition while in contact with said smoothing surface, at least three metal pressure edges disposed for engagement with the surface of the magnetic record medium opposite the active surface with the edges extending transversely to the direction of movement of the record medium, and means for urging the metal pressure edges against the surface of the record medium to press the active surface of the magnetic record medium into conforming engagement with the respective smoothing surface portions.

3. Apparatus for treating a magnetic record medium having a layer containing magnetizable material and providing an active surface of the magnetic record medium comprising means defining a smoothing surface of substantially optical smoothness and of substantially greater smoothness than the magnetic record medium active surface, means for moving the active surface of the magnetic record medium into contact with the smoothing surface and for moving the active surface of the magnetic record medium and the smoothing surface at substantially the same speed, means for placing the layer of the magnetic record medium containing said magnetizable material in a softened flowable condition while in contact with said smoothing surface, at least three fingers pivotally mounted at one end and having opposite ends with respective metal pressure edges engaging the surface of the magnetic record medium opposite said active surface and extending transversely to the direction of movement of the record medium, and means for urging each of said fingers to pivot in a direction to press the metal pressure edge thereof against said surface of the magnetic record medium opposite said active surface to press the active surface of the magnetic record medium into conforming contact with said smoothing surface.

4. Apparatus for treating a magnetic tape record medium having an active layer containing magnetizable particles and defining an active external surface of the record medium, the record medium having an opposite external surface opposite said active surface, said apparatus comprising a smoothing drum having a cylindrical smoothing surface of substantially optical precision symmetrically disposed with respect to a central axis of the drum, means for rotating said drum about its central axis, means for guiding the magnetic tape record medium about said drum with the active surface thereof in contact with said cylindrical smoothing surface from a point of initial contact therewith to a point of departure therefrom and for moving the record medium at a linear speed corresponding to the surface speed of said cylindrical smoothing surface, means for applying a moistening agent to the active surface of the magnetic tape record medium of a material to soften the active layer of the record medium without appreciably dissolving it to soften the active layer and to enable the active layer to separate from the cylindrical smoothing surface at said point of departure, means for heating the cylindrical smoothing surface to a temperature of about 250° F. and for maintaining said smoothing surface at said temperature of about 250° F. during a smoothing operation, a stripping roll adjacent said point of departure for receiving said opposite external surface of said record medium in contact therewith and for stripping said magnetic tape record medium from said cylindrical smoothing surface at said point of departure, at least three elongated metal fingers having length dimensions extending at respective acute angles to the cylindrical smoothing surface at successively offset positions along the path of the magnetic tape record medium about said drum, said fingers having respective first ends removed from said cylindrical smoothing surface and respective opposite second ends adjacent said cylindrical smoothing surface and terminating in respective integral metal pressure edges disposed parallel to the cylindrical smoothing surface and having a width dimension extending parallel to the central axis of said drum and exceeding the width dimension of said magnetic tape record medium, stationary means pivotally mounting the first ends of said fingers and accommodating pivotal movement of the pressure edges of the second ends of said fingers into pressure engagement with said opposite external surface of said magnetic tape record medium, and adjustable spring means acting on said fingers for urging said fingers into engagement with said opposite external surface of said magnetic tape record medium with an adjustable pressure, said spring means having means for adjusting the pressure of said spring means on said opposite external surface of said magnetic tape record medium, and said metal pressure edges successively engaging said opposite external surface of said magnetic tape record medium across the entire width thereof as it moves with the cylindrical smoothing surface about said central axis with the position of the first of said metal pressure edges being substantially spaced from the point of initial contact between the cylindrical smoothing surface and the active surface of the magnetic tape record medium in the direction of rotation of said drum, said metal pressure edges successively pressing successive portions of the active surface of the magnetic tape record medium after moistening and heating thereof into conforming pressure contact with said cylindrical smoothing surface.

References Cited in the file of this patent

UNITED STATES PATENTS

| | | |
|---|---|---|
| 2,296,372 | Smith et al. | Sept. 22, 1942 |
| 2,360,650 | Crane | Oct. 17, 1944 |
| 2,434,541 | Bierer | Jan. 13, 1948 |
| 2,442,443 | Swallow | June 1, 1948 |
| 2,511,703 | Ettl | June 13, 1950 |
| 2,551,966 | Pierce | May 8, 1951 |
| 2,614,288 | Chavannes | Oct. 21, 1952 |
| 2,663,050 | Helm | Dec. 22, 1953 |
| 2,683,894 | Kritchever | July 20, 1954 |
| 2,688,567 | Franck | Sept. 7, 1954 |
| 2,753,591 | Stevens et al. | July 10, 1956 |
| 3,060,515 | Corbett | Oct. 30, 1962 |